United States Patent [19]

Graetz et al.

[11] 4,432,827
[45] Feb. 21, 1984

[54] METHOD OF MAKING CASSETTE HOLDERS

[75] Inventors: Herbert Graetz, Chicago, Ill.; Ronald C. Unterreiner, Cape Girardeau, Mo.

[73] Assignee: Blair Industries, Inc., Scott City, Mo.

[21] Appl. No.: 489,781

[22] Filed: Apr. 29, 1983

Related U.S. Application Data

[62] Division of Ser. No. 376,147, May 7, 1982, Pat. No. 4,407,410.

[51] Int. Cl.³ .............................................. B29C 3/04
[52] U.S. Cl. ................................. 156/245; 156/250; 156/252; 156/285; 206/387
[58] Field of Search ............... 156/242, 245, 285, 250, 156/252; 206/387

[56] References Cited

U.S. PATENT DOCUMENTS

| D. 226,146 | 1/1973 | Price | D87/1 |
|---|---|---|---|
| 667,495 | 2/1901 | Butler . | |
| 709,687 | 9/1902 | Vernon . | |
| 748,631 | 1/1904 | Mitchell . | |
| 2,369,864 | 2/1945 | Spaldo | 281/34 |
| 2,788,041 | 4/1957 | Carver | 150/39 |
| 2,883,061 | 4/1959 | Moore | 211/13 |
| 3,028,949 | 4/1962 | Sohosky | 206/83 |
| 3,092,400 | 6/1963 | Smith | 281/19 |
| 3,215,450 | 11/1965 | Peterson et al. | 281/29 |
| 3,315,718 | 4/1967 | Berman | 150/5 |
| 3,335,847 | 8/1967 | Murphy et al. | 206/15 |
| 3,414,181 | 12/1968 | Sloan | 229/2.5 |
| 3,487,919 | 6/1970 | Elliott et al. | 206/65 |
| 3,640,379 | 2/1972 | Weingarden | 206/1 R |
| 3,737,067 | 6/1973 | Palson | 220/60 |
| 3,743,081 | 7/1973 | Roberg et al. | 206/1 |
| 3,814,527 | 6/1974 | Lawes | 402/3 |
| 3,902,598 | 9/1975 | Koob et al. | 206/387 |
| 4,049,119 | 9/1977 | Wilson | 206/387 |
| 4,054,206 | 10/1977 | Kobayashi et al. | 206/387 |
| 4,078,657 | 3/1978 | Schurman | 206/387 |
| 4,102,452 | 7/1978 | Sato et al. | 206/387 |
| 4,127,189 | 11/1978 | Shumrak et al. | 206/520 |
| 4,231,474 | 11/1980 | Takahashi | 206/387 |
| 4,287,989 | 9/1981 | Plummer | 206/387 |
| 4,341,307 | 7/1982 | Shyers | 206/387 |
| 4,363,403 | 12/1982 | Raucci, Jr. et al. | 206/387 |

FOREIGN PATENT DOCUMENTS

| 504239 | 10/1952 | Belgium | 206/472 |
|---|---|---|---|
| 2451347 | 6/1976 | Fed. Rep. of Germany . | |
| 2331120 | 3/1977 | France . | |
| 2030545A | 4/1980 | United Kingdom . | |

OTHER PUBLICATIONS

Mid America Plastics, (6860 Canby, Reseda, CA 91335), Order Sheet Showing VHS and Betamax Cassette Cases.

Primary Examiner—Caleb Weston
Attorney, Agent, or Firm—Hill, Van Santen, Steadman & Simpson

[57] ABSTRACT

A book simulating holder or album for cassettes and the like has a cover with front and rear flaps connected by a wide flexible spine with complementary interfitting trays on the inner faces of the flaps and, if desired, a pocket forming strip overlying the cover secured to the bottom and side edges thereof. The trays are formed from a single sheet of plastics material and a portion of this sheet between the trays overlies the spine of the cover. The plastics sheet is vacuum molded to the desired tray contours. Stiffeners such as cardboard are sandwiched between the bottoms of the trays and the flaps of the cover to rigidify the structure. The cover is also a single sheet of plastics material bonded around its marginal edges to the molded tray sheet and the pocket forming strip is simultaneously bonded to the cover.

17 Claims, 12 Drawing Figures

METHOD OF MAKING CASSETTE HOLDERS

This is a division of application Ser. No. 376,147, filed May 7, 1982 now U.S. Pat. No. 4,407,410.

BACKGROUND OF THE INVENTION

1. Field of the Invention

This invention relates to the art of making book style holders or albums and specifically deals with the making of inexpensive, sturdy, wear resisting tape cassette holders or albums formed from bonded together molded tray, cover, and if desired, cover pocket plastics material sheets defining rigid tray carrying cover flaps and a book spine which will bow outwardly into an attractive rounded book front when the flaps are closed to stack the trays together and will tighten the pocket sheet, if any, on the cover.

2. Prior Art

Book style cassette albums have heretofore had separate trays and tray lids secured to the inner faces of top and bottom cover flaps with a rigid flat cover spine between the tray and lid hinged to the flap with a pocket forming strip overlying the lower portion of the front cover flap and spine. The spine had to be reinforced with a stiff insert and thin flexible hinge strips had to be provided between the spine and cover flaps. These hinges had depressed bonded seams which deformed the pocket sheet leaving defaced opaque strips over the hinges blocking viewing of an insert such as a title card in the pocket. Repeated use of the album soon stretched the pocket and weakened the hinge strips.

It would be an improvement in the art to make a book style cassette album which is less expensive, more attractive, and more wear resisting than heretofore known.

SUMMARY OF THE INVENTION

According to this invention, sturdy, inexpensive, wear resisting, book style albums for repeated use in the packaging and storing of articles such as cassettes of tape reels, particularly video cassettes, are formed from thermoplastic sheet or film material, particularly polyvinyl chloride sheets, and inexpensive stiffner inserts, particularly cardboard.

Specifically, a thin sheet of rigid polyvinyl chloride (non-plasticized) having a thickness within the general range of 0.15 to 0.20 inches is unreeled from a roll that is preferably about 26 inches wide, preheated as it leaves the roll to a thermoplastic softened state and is then thermoformed in a conventional mold which can be of the vacuum type, a pressure type or a combination of both. The thermoforming produces a plurality of pairs, preferably four, of complementary mating trays in parallel side by side relation with each pair separated by but integral with a flexible spine portion that is wider than the stacked or interfitted height of the trays.

The trays have hollow, upstanding peripheral walls surrounding a flat bottom and shaped to stack together in a closed condition with one tray snugly receiving the cassette, and the other tray forming a lid, or alternately, with both trays sufficiently deep to snugly receive cassettes and stack together in closed interfitting position.

The molded sheet is cooled back to about room temperature, stripped from the mold, severed from the preceding umolded sheet and inverted to present the hollow molded face. The uppermost flat tray bottom portions of each molded tray section are then covered with rigid cardboard pieces or slabs sized to fit within pockets in the base portions of the hollow peripheral walls. The cardboard is preferably about 0.07 to 0.08 inches thick. The molded sheet with the cardboard slabs is then covered with a flexible polyvinyl chloride (plasticized) sheet of any desired opaque color or finish, and having a thickness within the range of 0.010 to 0.014 inches. Then strips of thin clear flexible polyvinyl chloride (plasticized) are laid over the cover sheet at locations which will form pocket areas on any portions of the finished covers. These clear plastic strips have a thickness within the range of 0.004 to 0.012 inches.

The assembly of the stacked sheets and cardboard inserts is then sealed together for example by high frequency induction from an electrode overlying the peripheral margin of the cover so that the molded sheet, the cover and the strip will be bonded together around the entire peripheral edge of the stack. Then the sealed stack of sheets is cut into one or more units, preferably four books, each having a cover with rigid front and rear or top and bottom flaps, a tray on the inner face of each flap, and a flexible spine composed of molded sheet and cover sheet portions connecting the trays and flaps which are wider than the stack height of the interfitted trays to bow outwardly therefrom as the book is closed, thus tightening the pocket forming strip overlying the cover, if provided or desired.

Conventional vacuum moldable thermoplastic sheets and conventional thermoplastic cover and pocket forming strips are useful. Particularly non-plasticized or so-called "rigid" polyvinyl chloride sheets are used for the vacuum molding, while plasticized flexible polyvinyl sheets are used for the covers and pocket forming strips. These thermoplastic sheets are supplied by such companies as Arlington Mills, Arlington Heights, Ill.; American Hoechst Corporation, Coventry, R.I.; B.F. Goodrich Chemical Corporation, Cleveland, Ohio; General Tire and Rubber Co., Akron Ohio; Tenners Chemical Inc., Paddle Brook, N.J., and many others. It should be understood, however, that the invention is not limited to the use of polyvinyl chlorides and that the book album can be formed from other sheet vacuum moldable materials such as, for example, poly-styrenes.

It is then an object of this invention to provide a method of making albums for cassettes and the like inexpensively from plastic sheet materials to simulate books with outwardly bowed spines in their closed positions.

Another object of the invention is to provide a method of making book style albums or holders with rigid cover flaps carrying interfitting trays and a flexible spine forming a wide range hinge across its entire width connecting to the flaps which will bow outwardly when the trays are in a closed interfitted stacked position.

Another object of the invention is to provide a method of making book style holders or albums for video tape cassettes and the like having rigid top and bottom flaps with a molded sheet secured to the cover providing mating trays on the inner faces of the flaps and having a flexible spine between the trays wider than their mated stacked height, together, if desired, with a flexible strip bonded to the outer and bottom edges of the cover forming pockets over the flaps and spine which are maintained in a taut condition when the book is closed because of an outward bulging of the wide spine.

Another object of the invention is to provide a method of making book style albums or holders from a molded tray sheet, stiffner slabs backing the trays, a cover sheet, and an overlying pocket forming strip where the trays remain connected by a flexible spine portion wider than the height of the book in its closed position.

Another object of the invention is to provide a method of forming book style cassette albums from plastics material sheets and cardboard inserts which eliminates heretofore required spine stiffeners, and thin hinge sections.

Other and further objects of this invention will become apparent to those skilled in this art from the following detailed description and the annexed sheets of drawings which show preferred best mode embodiments of the invention.

DESCRIPTION OF THE PREFERRED BEST MODE EMBODIMENTS SHOWN ON THE DRAWINGS

Figures 1, 2, 3:
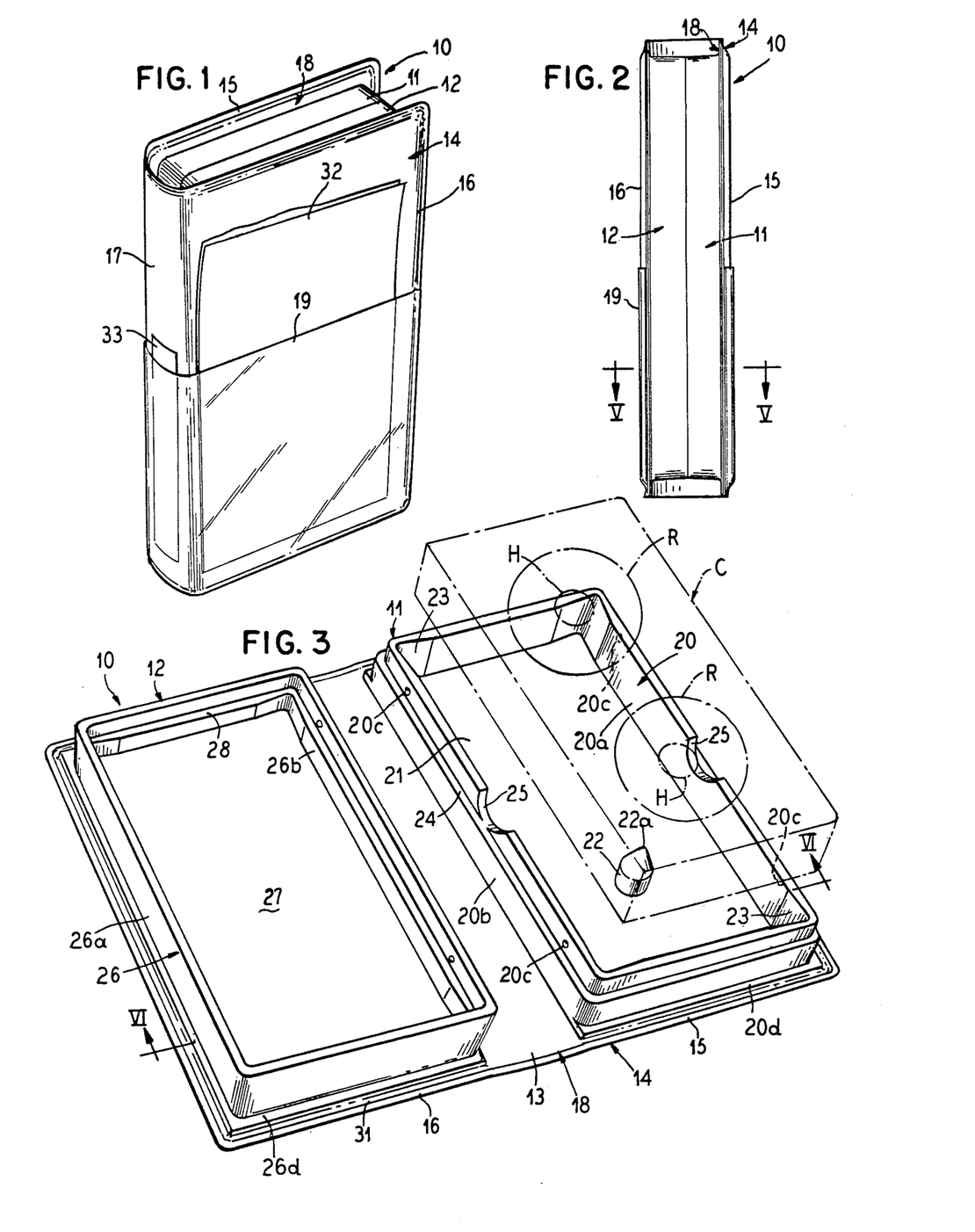
FIG. 1 is a perspective view of a holder or album made by the method of this invention in its closed position, as viewed from the top and front of the cover flap side.
FIG. 2 is a rear elevational view of the holder of FIG. 1.
FIG. 3 is a perspective view of the holder of FIGS. 1 and 2 in its opened position, as viewed from the inside and showing in dotted lines a cassette for insertion in the holder.
Figure 4:
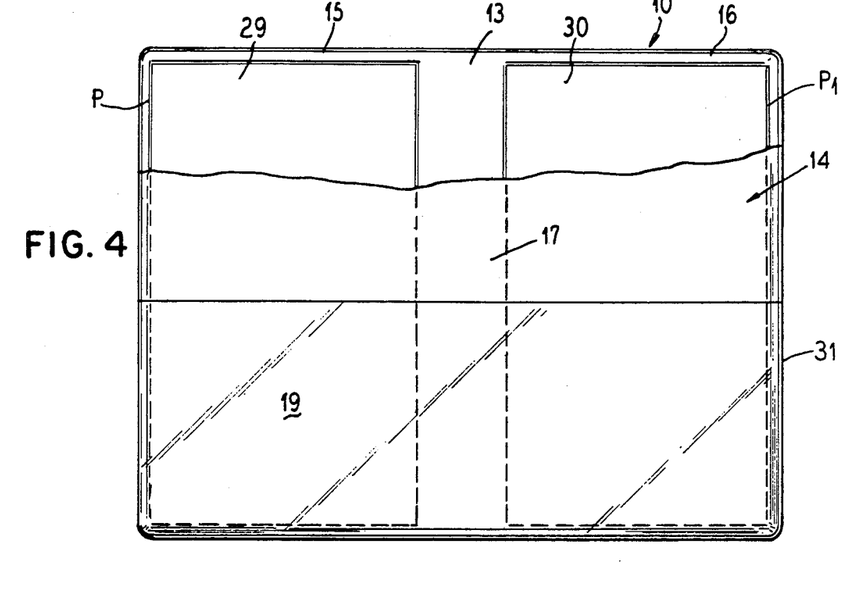
FIG. 4 is a plan view of the outside of the holder in its opened position with portions cut away to show underlying structure.
Figure 5:
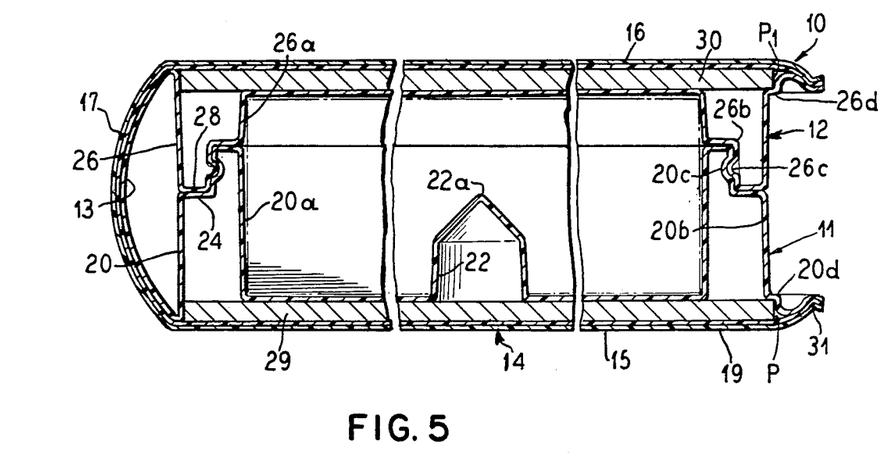
FIG. 5 is a broken transverse cross-sectional view along the line V—V of FIG. 2.
Figures 6, 6A, 7:
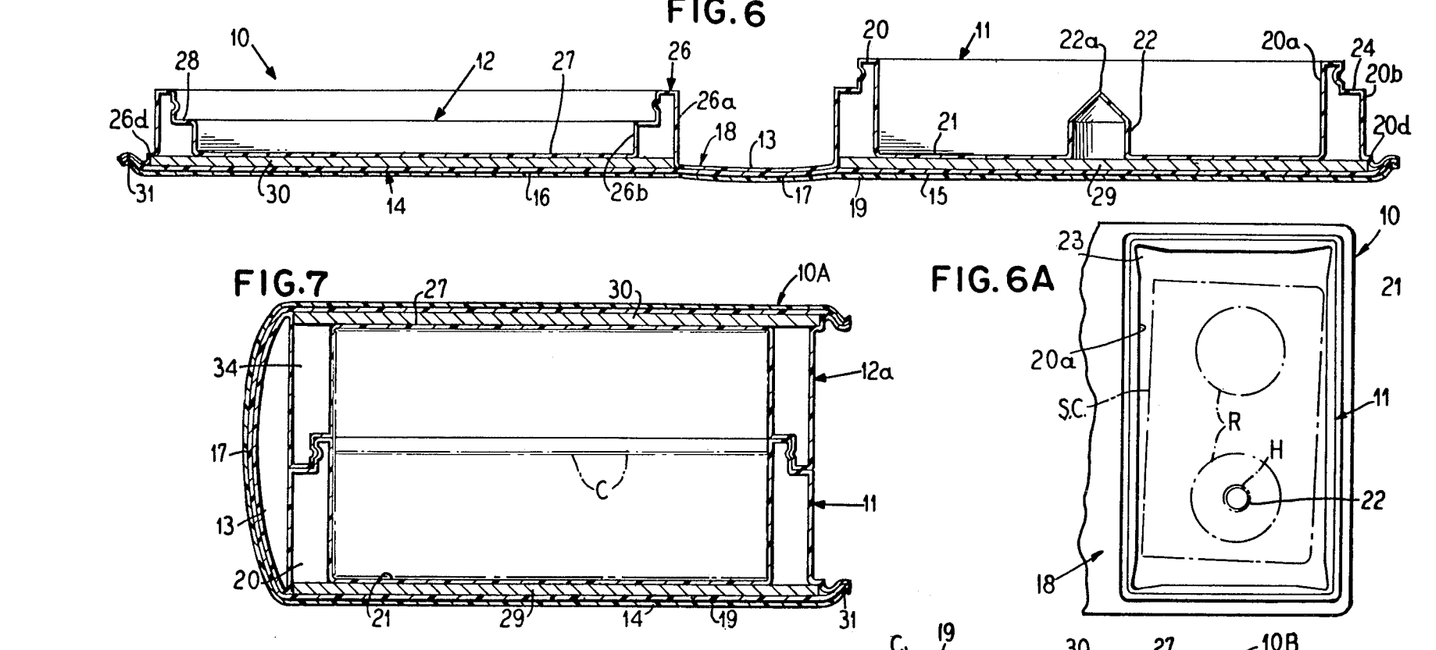
FIG. 6 is a longitudinal cross-sectional view along the line VI—VI of FIG. 3.
FIG. 6A is a fragmentary plan view illustrating the position of a small or undersized cassette in a tray sized for accepting a larger cassette, and showing how the locator pin in the tray positions the smaller cassette.
FIG. 7 is a view similar to FIG. 5 but showing a modified construction.

The holder or album 10 of FIGS. 1 to 6 has a pair of relatively rigid interfitting trays 11 and 12 which are stacked together in the closed position as shown in FIGS. 1, 2 and 5, and which are separated in spaced parallel side by side relation by an integral flexible spine liner portion 13 when in the flat open position of FIGS. 3 and 6. A cover 14 has a rear or bottom flap 15 overlying the tray 11 and a front or top flap 16 overlying the tray 12 with an integral spine connecting the flaps 15 and 16 at the front side of the book.

The trays 11 and 12 are formed by vacuum molding from a single sheet 18 of thermoplastic resin with a peripheral margin bonded to the single sheet cover 14 with the connecting spine portion 13 forming a liner underlying the spine portion 17 of the cover. A two-ply flexible spine is thus provided.

A strip 19 of plasticized flexible thermoplastic resin, preferably, a transparent strip, overlies any desired portion, such as the bottom half, of the cover, being wrapped around both flaps 15 and 16 and the spine 17 and bonded at its ends and at its bottom to the side edges and bottom edge of the cover.

The molded tray portion 11 of the sheet 18 has a stepped upstanding hollow peripheral wall 20 surrounding a flat bottom 21 which is somewhat depressed from the original plane of the flat sheet 18 to form a pocket P in the hollow side of the molded sheet. A cylindrical cassette locator pin 22 with a conically pointed top end 22a is molded in the flat bottom to project upwardly at the longitudinal center thereof, but is spaced closer to the bottom of the tray than to the top end. The peripheral side wall 20, preferably has the four corners thereof thinned down as shown at 23 to provide air release gaps when a snug fitting cassette is inserted in the tray.

The peripheral side wall 20 has a flat inner face 20a with a slight draft angle, preferably 3°, snugly embracing the periphery of a cassette C with the taper of the face facilitating insertion and removal of the cassette to rest on the bottom 21 of the tray.

The peripheral wall 20 has a stepped upstanding outer face 20b with a horizontal rim 24 intermediate the height of the wall. This outer face 20b has projecting nibs 20c just above the rim 24 which are positioned on the long sides of the peripheral wall near the ends. A pair of nibs is provided on each long side.

Arcuate depressions 25 are formed in the top edge of the wall 20 on the sides thereof about midway of the length to provide finger openings for grasping the sides of a cassette C which is snugly embraced by the wall to facilitate lifting the cassette out of the tray.

The other tray 12 provides a lid for the tray 11 and also has an upstanding peripheral wall 26 surrounding a flat slightly depressed bottom 27, providing a pocket P₁ in the hollow side of the molded sheet 18. The wall 26, however, has a flat outer face 26a and a stepped inner face 26b with a flat shoulder 28 about midway of the height of the wall. The stepped face 26b is sized to snugly embrace and interfit with the stepped outer face 20b of the wall 20 with the shoulder 28 resting on the rim 24 when the trays are in closed stacked condition as shown in FIGS. 1, 2 and 5. The long sides of the stepped inner face 26b have depressed dimple recesses 26c therein to receive the nibs 20c when the trays are closed as shown in FIG. 5. The interfitting projections 20c and dimples 26c snap together as the book is closed to hold the trays in closed sealed stacked relation. The walls 20b and 26b are sufficiently flexible to accommodate the snapping together and the unsnapping of the nibs and dimples.

As shown in FIGS. 4, 5 and 6, a rectangular rigid cardboard slab 29 is sandwiched between the cover flap 15 and the bottom 21 of the tray 11, while a similar slab 30 is sandwiched between cover flap 15 and the bottom 27 of the tray 12. The slabs fit in the pockets P and P₁ behind the bottoms 21 and 27 provided by stepped, outturned shoulders 20d and 26d formed around the bottom ends of the outer sides of the walls 20b and 26a but extending only along the outer sides and ends of these walls. The inner side edges of the pockets are defined by the sides of the spine liner 13.

The cover sheet 14, the tray sheet 18, and the pocket forming strip 19 are all sealed together around a crimped bead peripheral edge 31 which projects beyond the walls 20 and 26 of the trays 11 and 12 to provide a book cover edge for the album to hide the trays within the confines of the cover. However, the spine liner 13 connecting the trays 11 and 12 and the spine 17 connecting the cover flaps 15 and 16 are not bonded together. Thus, the cardboard inserts 29 and 30 are sealed in place in pockets P and P₁ under the bottoms 21 and 27 of the trays. The crimped bead 31 provides a finished margin for the book.

Since the spine liner portion 13 of the tray sheet 18 and the spine portion 17 of the cover 14 are wider than the stacked closed height of the trays 11 and 12 and are flexible across their entire widths, the spine and its liner forms a wide flexible hinge which will be arcuately bowed outwardly as the album is closed from its opened flat condition of FIG. 3 to its closed book simulating condition of FIGS. 1 and 2. The wide hinge distributes bending stresses and prevents development of creases as the cover flaps are repeatedly opened and closed. The outward bowing, as illustrated in FIG. 5, will draw the strip 19 into a taut condition, closing the pockets between the strip and the cover. These pockets are useful to retain sales or rental papers 32 on the front flap 16 of the cover and to also retain a strip 33 over the spine in the front edge of the book. The papers and strip are easily inserted in the pockets when the album is in its opened flat position as shown in FIGS. 3, 4 and 6, where the pockets are in a relaxed condition.

In the modified holder or album 10A of FIG. 7, parts corresponding with parts described for the album 10 have been marked with the same reference numerals. The cover tray 12a, however, is deeper than the tray 12. The peripheral wall 34 of the deeper tray 12a is shaped to snugly receive a second cassette C. The stepped inner and outer contours of the tray walls 20 and 34 complement each other to interfit in the closed position of FIG. 7. A twin pack album 10A is thus provided, functioning in the same manner as the above described album 10, but of course, having a greater height so that each tray can receive a cassette. The snug fits of the cassettes in the trays will retain them in the trays until they are pulled out by gripping their side walls through the finger securing depsressions 25 described above.

Figure 8:
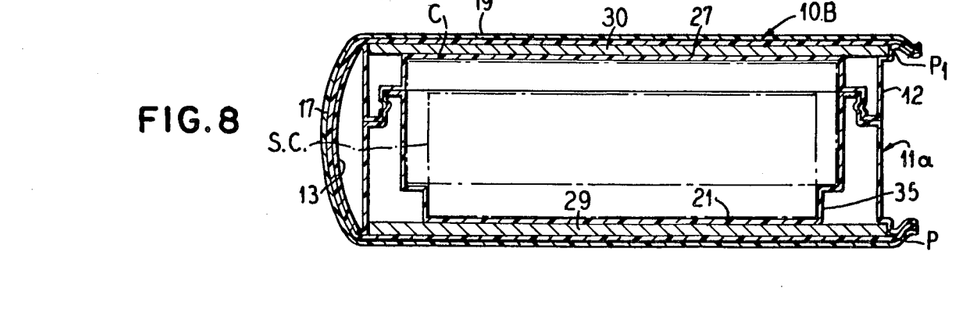
FIG. 8 is a view similar to FIGS. 5 and 7 but showing a further modified construction.

In the further modified album 10B of FIG. 8, parts corresponding with the parts of the album 10 have been marked with the same reference numerals. As shown in FIG. 8, however, the tray 11a is modified to provide a well 35 in the bottom 21 thereof with an upstanding peripheral wall for snugly embracing a smaller tape cassette S.C. The larger cassette C snugly fits the inner faces of the trays 11a and 12 in the same manner as described for the album 10. As shown in FIG. 6A, the smaller cassette S.C., instead of being snugly received in a well 35 in the bottom of the tray 21, as in the modified album 10b in FIG. 8, can loosely fit within the larger tray 12 with the locator pin 22 inserted in the hub of the reel of this smaller cassette to prevent the small cassette from sliding loosely in the oversized tray. The locator pin holds the cassette against endwise movement in the oversized tray.

Figure 9:
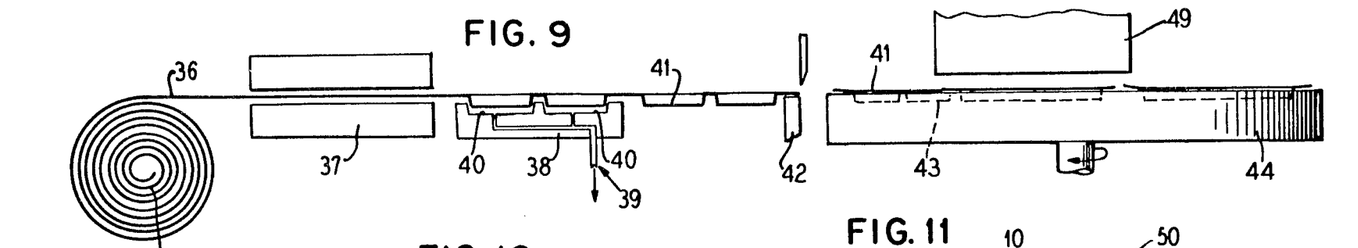
FIG. 9 is a diagrammatic side view illustrating the method of making the holders of this invention.

A high-speed inexpensive method of this invention is illustrated in FIG. 9, wherein a reel 35 of rigid polyvinyl chloride sheet or film material 36 is unwound to pass the sheet through a heating station 37 where it is softened to thermoforming temperatures and then thermoformed, for example, in an aluminum vacuum forming mold 38 having pockets to shape a plurality of pairs of the interfitting trays 11 and 12. Four of such pairs can conveniently be formed in a sheet 36 which is about 26 inches wide. Thermoforming applied at 39 to the pocket 40 of the mold 38 shapes the sheet into full conformity with the mold, whereupon the sheet is chilled and a molded tray sheet portion 41 is ejected from the mold and advanced to pull another segment of the sheet 36 to the mold station. The molded sheet form 41 is then severed from the preceding sheet portion 36 by any suitable cutting action at 42 and is then deposited into a receiving station pocket 43 of a turntable 44 in an inverted position to expose the hollow face of the molded sheet 41 to the top.

Figure 10:
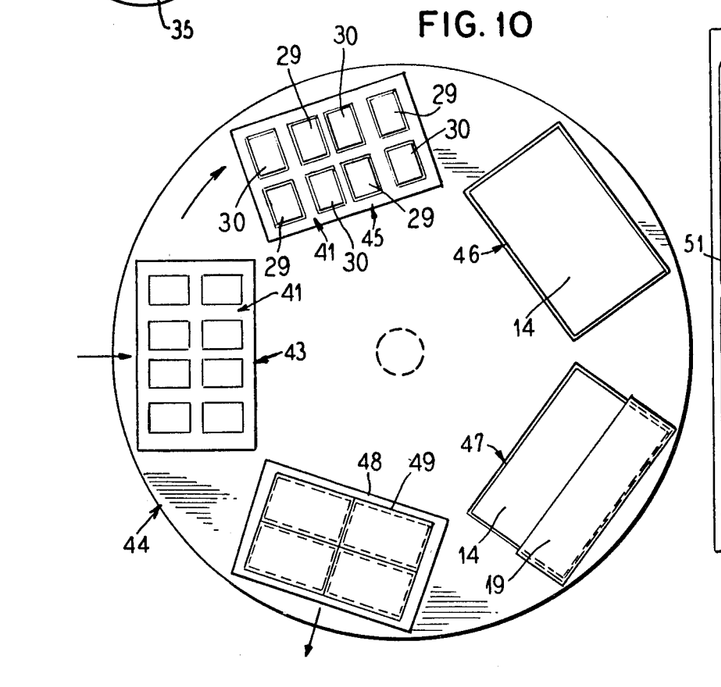
FIG. 10 is a diagrammatic plan view of an assembly table useful in the method of this invention.

As shown in FIG. 10, the table 44 may be rotated from its receiving station 43 to a second station 45 where the cardboard slabs 29 and 30 are deposited over the bottoms 21 and 27 of the tray portions 11 and 12 in the pockets P and P₁. Then the table may be rotated to a third station 46 where the cover sheet 14 is applied over the cardboard carrying molded sheet 41. A fourth station 47 is provided where the pocket forming strip 19 is laid over the cover sheet 14. A fifth station 48 is provided with any type of sealing or bonding die 49 such as a high frequency current electrode which crimps the edges 31 and bonds the sheets together around the periphery of each book section. The bonded multi-book unit is cut to form the individual book type albums 10, 10A or 10B as described hereinabove.

Figure 11:
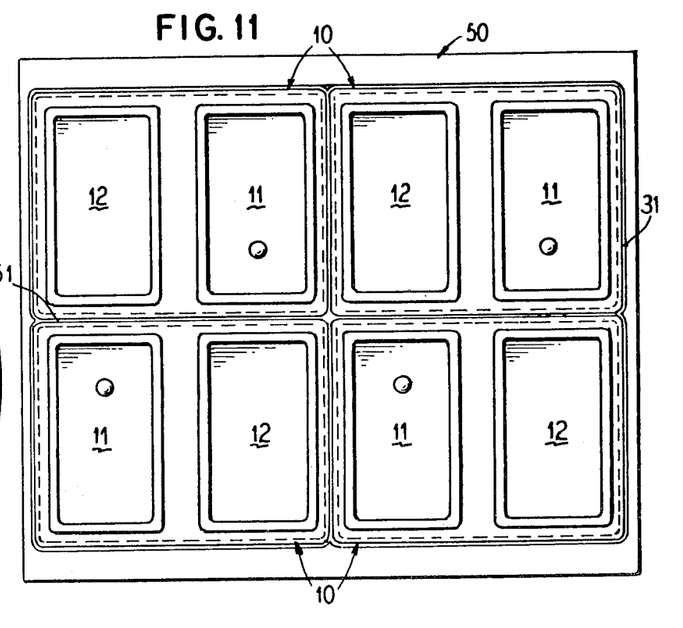
FIG. 11 is a plan view of the molded sheet formed in the method.

As shown in FIG. 11, each molded sheet unit 50 containing four album units 10 with each album unit having a pair of trays 11 and 12 has tear seal margins 51 around the crimped bead bonds 31 formed by the electrode die 49. These tear seal margins, as shown, are very narrow to minimize scrap and are easily torn from the book unit 10 to separate the molded sheet 50 into four complete book units.

From the above descriptions, it will therefore be understood that this invention provides book type albums or holders for cassettes and the like from a molded tray sheet, rigidifying tray backing slabs, a cover sheet, and, if desired, a cover pocket strip. The tray sheet has a wide flexible spine portion between pairs of interfitting tray defining portions which is wider than the stacked interfitted height of the tray in the closed position of the book and the cover has a conforming overlying conforming flexible spine portion. In the closed position of the book, the spine liner and spine cover will bulge outwardly from the trays presenting an attractive rounded front end for the book free from heretofore required crimped hinge strips to distribute the bending action over a wide area. This arrangement eliminates the heretofore encountered severe bending stresses between the book flaps and the connecting spine. This bulging action will also draw tight any pocket forming strip on the cover and the pocket will extend over both flaps and spine and can be of any desired height on the cover to receive inserts as desired.

While various changes and modifications might be proposed by those skilled in the art, it will be understood that we wish to include within the claims of the patent warranted hereon all such changes and modifications as reasonably come within our contribution to the art.

We claim as our invention:

1. The method of making a book-style album which comprises thermal forming a thermoplastic sheet to define a plurality of pairs of trays and lids in side-by-side relation connected by flexible spines, covering the bottoms of the trays and lids with rigid slabs, covering the slab-receiving side of the thermoplastic sheet with a second thermoplastic sheet, crimping and bonding the sheets together around the margins thereof, providing tear margins around the crimped bond to facilitate severing of the bonded sheets, and severing the bonded sheets along the tear margins to provide a plurality of book-type holders each with rigid flaps, a tray on one flap, a lid on the other flap, and a flexible spine and spine liner connecting the tray and lid.

2. The method of making a book-style album which comprises unwinding a thermoplastic sheet from a roll, preheating the sheet, thermal forming the sheet to define a plurality of pairs of trays and lids in side-by-side relation connected by flexible spines, severing the sheet from the roll, depositing the thermal formed severed sheet in the pocket of a receiving station with the bottoms of the trays and lids facing upward, covering said bottoms of the trays and lids with rigid slabs, covering the slab-receiving side of the thermal formed sheet in said pocket with a second thermoplastic sheet, bonding the sheets together around the margins thereof, and severing the bonded sheets to provide a plurality of book-type holders each with rigid flaps, a tray on one flap, a lid on the other flap, and a flexible spine and spine liner connecting the tray and lid.

3. The method of claim 2 wherein the receiving station is a turntable.

4. The method of making a book-style album which comprises thermal forming a rigid thermoplastic sheet to define a plurality of pairs of adjoining tray and lid portions in side-by-side relation with the tray and lid portion of each pair connected by an integral spine portion between the adjoining sides of the tray and lid portions and with a peripheral margin around each pair of tray and lid portion, covering said thermal formed rigid thermoplastic sheet with a second thermoplastic sheet overlying the bottoms of the tray, lid, spine and margin portions, bonding the sheets together around the peripheral margins of each pair of trays and lids, and severing the bonded sheets along the bonded margins to provide a plurality of book-type holders, each with cover flaps, a tray on one flap, a lid on the other flap, and a spine and spine liner connecting the tray and lid.

5. In the method of claim 4, the steps of thermal forming the side-by-side tray and lid of each pair to interfit and stack together in the closed position of the album, and forming the spine and spine liner with widths greater than the combined stacked height of the interfitted tray and lid for bowing the spine and liner outwardly when the album is closed.

6. The method of claim 4 including the step of thermal forming the rigid thermoplastic sheet into a panel having a plurality of parallel rows of said pairs of trays and lids with a plurality of pairs in each row.

7. The method of making a book-style album which comprises thermal forming a thermoplastic sheet to define a plurality of pairs of adjoining trays, with the trays of each pair in side-by-side relation and connected by an integral flexible spine and with the pairs of trays connected by peripheral marginal portions, covering the bottoms of the trays with rigid slabs, covering the slab-receiving face of the thermoplastic sheet with a second thermoplastic sheet, bonding the sheets together around the peripheral margin of each pair of trays, and severing the bonded sheets along the margins to separate the pairs of trays and spine and to form a plurality of book-type holders each with rigid flaps, a tray on each flap, and a flexible spine and spine liner connecting the trays.

8. The method of claim 7 including the step of thermal forming the thermoplastic sheet into a panel having adjacent parallel rows of a plurality of pairs of trays and lids with the trays of one row aligned with the lids of the other row and the lids of the one row aligned with the trays of the other row.

9. The method of claim 7 wherein the second thermoplastic sheet is more pliable than the thermal formed plastic sheet.

10. The method of claim 7 including the step of thermal forming pockets in the peripheral portions of the trays sized for receiving said slabs and fitting said slabs in said pockets.

11. The method of claim 7 which comprises covering a portion of the second thermoplastic sheet with a thermoplastic film and bonding the film to the second sheet along some of the margins to form a pocket with an open side overlying the flaps and spines.

12. The method of making a book style holder which comprises thermal forming a thermoplastic sheet into a shape defining a plurality of pairs of interfitting trays each with hollow upstanding peripheral walls and flat bottoms and with trays of each pair connected in side-by-side relation with a flexible spine portion therebetween and having marginal portions around the periphery thereof, covering the bottoms of said trays with rigid slabs, covering the slab-covered sheet with a second thermoplastic sheet, covering at least a portion of the second thermoplastic sheet with a third thermoplastic sheet, thermal bonding the stacked sheets around the peripheral margin of each pair of trays, and severing the bonded margins between each pair of trays to provide a plurality of book-style holders each with rigid cover flaps having trays on the inner faces connected by a flexible spine and spine liner and a pocket between the second and third sheets.

13. The method of claim 12 including the step of forming the flexible spine and spine liner portions each with widths sufficient to bow outwardly and tighten the pocket when the trays are stacked together in interfitting relation in the closed position of the holder.

14. The method of making book style holders which comprises unwinding a first thermoplastic sheet from a roll, thermal forming successive increments of the sheet into panels each having upstanding hollow peripheral walls defining a plurality of pairs of inter-fitting trays with the trays of each pair connected by a flexible spine and surrounded by a marginal portion, covering the underside of the bottoms of the trays of each panel with rigid pieces of cardboard, covering the cardboard covered panel with a second thermoplastic sheet, thermal bonding the sheets together around the margins of each pair of trays and cutting the sheets along the bonded margins to form a plurality of book-style holders each with rigid cover flaps, a flexible spine and spine liner connecting the flaps, and a tray on the inside face of each cover flap.

15. The method of claim 14 wherein the first thermoplastic sheet is a relatively rigid polyvinyl chloride sheet and the second thermoplastic sheet is plasticized.

16. The method of making a book style album which comprises thermal forming a first thermoplastic sheet to define on one face thereof a pair of raised complimentary interfitting tray portions in side-by-side relation connected by an integral flexible spine portion and surrounded by a flat margin portion, forming the width of the spine portion to be wider than the height of the interfitted tray portions, covering the opposite face of the thermal formed first sheet with a second thermoplastic sheet and bonding the second sheet to the margin portion of the first thermal formed sheet to form the album with cover flaps, a tray portion on the inner face of each flap and a flexible wide spine and spine liner portion that will bow outwardly when the album is closed to interfit the tray portions together.

17. The method of claim 16 including the step of thermal forming the first sheet to define depressed pockets in said opposite face around the tray portions and fitting rigid slabs in said pockets to overlie the bottoms of the tray portions before covering the first sheet with the second sheet to thereby provide the album with rigid tray bottoms.

* * * * *

UNITED STATES PATENT AND TRADEMARK OFFICE
CERTIFICATE OF CORRECTION

PATENT NO. : 4,432,827
DATED : February 21, 1984
INVENTOR(S) : Graetz et al

It is certified that error appears in the above—identified patent and that said Letters Patent is hereby corrected as shown below:

Cancel the Abstract [57] and insert the following:

--ABSTRACT OF THE DISCLOSURE--

--Book simulating holders or albums for cassettes and the like are easily and inexpensively thermo-formed from a relatively rigid thermoplastic sheet to define interfitting trays connected in side-by-side relation by a wide flexible spine and from a more flexible cover sheet with rigid cardboard flaps interposed between the bottoms of the trays and the cover sheet. The wide flexible spine backed by the more rigid spine liner of the thermo-formed sheet bows outwardly when the trays are interfitted together in the

UNITED STATES PATENT AND TRADEMARK OFFICE
CERTIFICATE OF CORRECTION

PATENT NO. : 4,432,827
DATED : February 21, 1984
INVENTOR(S) : Graetz

It is certified that error appears in the above—identified patent and that said Letters Patent is hereby corrected as shown below:

closed position of the album. A plurality of albums are formed from a single sheet which are severed without waste of material to separate the formed albums. A third flexible sheet can overlie the cover sheet to form pockets on the cover for receiving indicia.

Signed and Sealed this

Twelfth Day of June 1984

[SEAL]

Attest:

Attesting Officer

GERALD J. MOSSINGHOFF
Commissioner of Patents and Trademarks

UNITED STATES PATENT AND TRADEMARK OFFICE
CERTIFICATE OF CORRECTION

PATENT NO. : 4,432,827

DATED : February 21, 1984

INVENTOR(S) : Graetz et al

It is certified that error appears in the above—identified patent and that said Letters Patent is hereby corrected as shown below:

Column 1, line 48, change "0.15 to 0.20" to --0.015 to 0.020--

Signed and Sealed this

Twenty-third Day of December, 1986

Attest:

DONALD J. QUIGG

*Attesting Officer*    *Commissioner of Patents and Trademarks*